United States Patent [19]

Mathieu

[11] 4,429,213
[45] Jan. 31, 1984

[54] ELECTRICALLY HEATED FLUID CONDUIT
[75] Inventor: Julien C. Mathieu, Waynesville, N.C.
[73] Assignee: Dayco Corporation, Dayton, Ohio
[21] Appl. No.: 123,237
[22] Filed: Feb. 21, 1980

Related U.S. Application Data
[63] Continuation of Ser. No. 953,282, Oct. 20, 1978, abandoned.
[51] Int. Cl.³ .................. H05B 3/40; F24H 1/14; F16L 11/12
[52] U.S. Cl. .................. 219/301; 138/33; 138/137; 138/141; 219/300; 219/338; 219/522; 219/531; 264/45.5; 264/46.1; 428/920
[58] Field of Search .............. 219/300, 301, 338, 531, 219/522; 264/45.5, 45.6, 46.1; 428/920; 138/33, 137, 141; 174/47

[56] References Cited
U.S. PATENT DOCUMENTS

| | | | |
|---|---|---|---|
| 1,202,957 | 10/1916 | Baugham | 219/301 X |
| 2,211,380 | 8/1940 | Mikkelson | 219/301 X |
| 3,338,476 | 8/1967 | Marcoux | 219/300 X |
| 3,355,572 | 11/1967 | Chrow | 219/301 |
| 3,359,351 | 12/1967 | Bender | 264/45.5 |
| 3,476,841 | 11/1969 | Bienert | 264/45.6 |
| 3,582,968 | 6/1971 | Buiting et al. | 219/338 X |
| 3,619,560 | 11/1971 | Buiting et al. | 219/300 |
| 3,654,061 | 4/1972 | Berwanger | 428/920 X |
| 4,146,562 | 3/1979 | Fukushima et al. | 264/45.5 |
| 4,156,127 | 5/1979 | Sako et al. | 219/301 X |

Primary Examiner—A. Bartis
Attorney, Agent, or Firm—Joseph V. Tassone

[57] ABSTRACT

An electrically heated fluid conduit includes a plastic pipe adapted to carry a flow of fluid subject to freezing at low temperatures, an electric resistance heater disposed around the pipe and extending along the length thereof and a thermal insulating jacket disposed around the heater. The heater is formed as a seamless sleeve of synthetic polymeric material having electrically conductive carbonaceous particles therein and is connected to the lead wires of an electrical power cable by a pair of spaced electrically conductive bands fixed around the sleeve and defining the length of the heater along the pipe. The thermal insulating jacket is formed as a seamless layer of foamed synthetic plastic material having randomly disposed air pockets. The outer portion of the jacket is compacted to reduce size of the air pockets immediately adjacent to the outer surface of the jacket so that the jacket has a higher density wear and impact resistant outer surface and good thermal insulating properties adjacent the pipe and heater.

2 Claims, 7 Drawing Figures

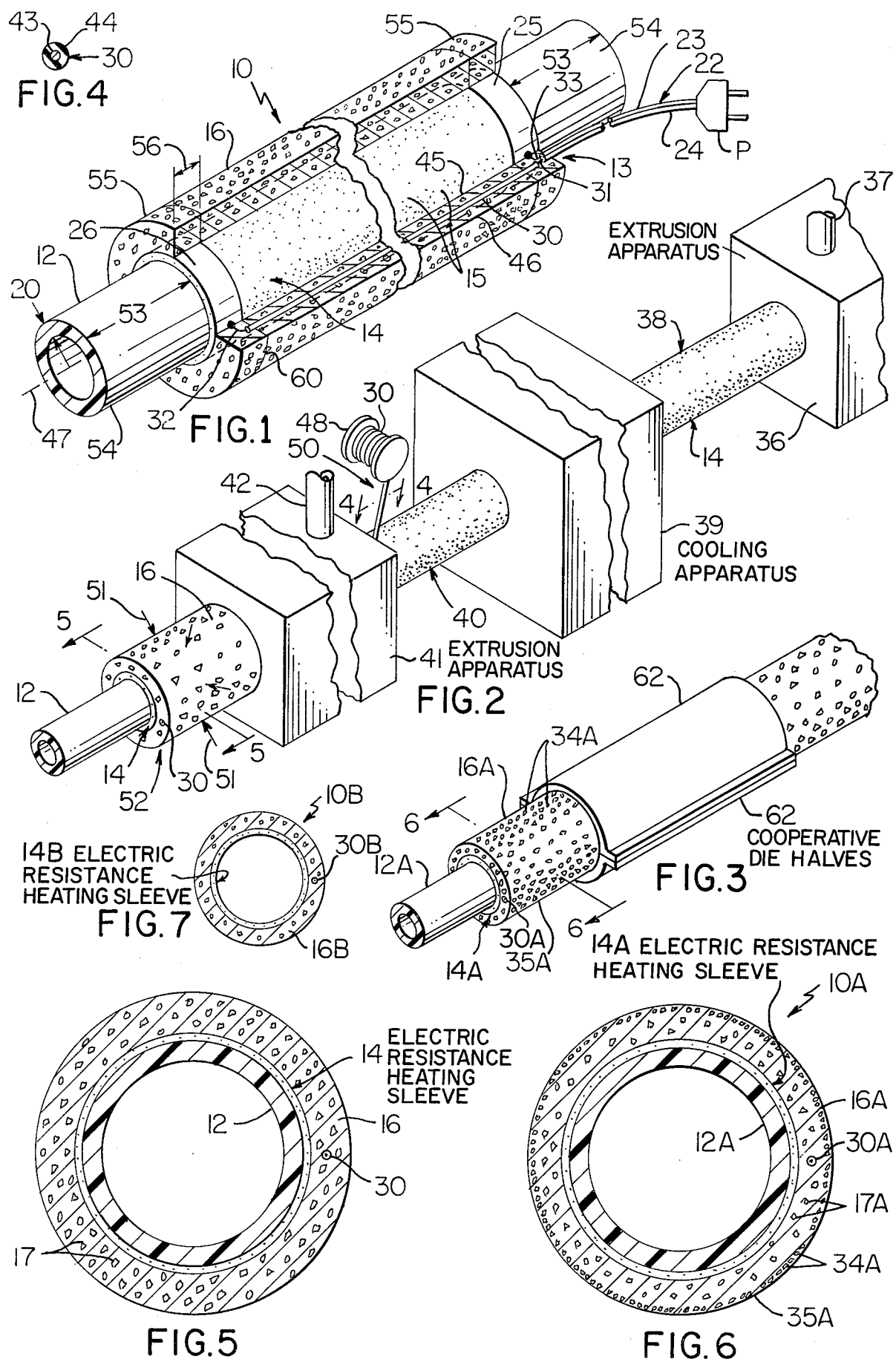

ELECTRICALLY HEATED FLUID CONDUIT

This is a continuation of application Ser. No. 953,282, filed Oct. 20, 1978, now abandoned.

BACKGROUND OF THE INVENTION

1. Field of the Invention

This invention relates to an electrically heated conduit construction and method of making same.

2. Prior Art Statement

It is known in the art to provide an electrical heater in the form of an insulated electrical heating wire along the length of a pipe and wrap such insulated wire with an insulating material to retain heat therefrom within the insulating material and thereby maintain the pipe and its content at a temperature above the freezing temperature of the liquid carried therein. Such constructions are widely used to maintain water pipes running through unheated or open areas from freezing at temperatures below zero degree Centigrade. However, conduit constructions of this type are inherently expensive and comparatively inefficient.

It is also known to provide a primarily polymeric hose with a layer of carbonaceous particles for the purpose of dissipating static electricity and as shown in U.S. Pat. No. 4,059,847.

SUMMARY

It is a feature of this invention to provide a simple, economical, and efficient conduit construction which is particularly adapted to carry liquids which are subject to freezing at temperatures below the freezing temperatures of such liquids.

Another feature of this invention is to provide a conduit construction of the character mentioned which is particularly adapted to carry water at temperatures below zero degree Centigrade.

Another feature of this invention is to provide a conduit construction comprised of a pipe made primarily of a polymeric material and used for carrying an electrically nonconducting liquid and such pipe has an insulating jacket disposed therearound wherein the pipe itself comprises a part of an electrical heater.

Another feature of this invention is to provide a conduit construction of the character mentioned comprised of a polymeric fluid-carrying pipe which has an integral polymeric sleeve disposed thereagainst wherein such sleeve serves as an electrical heater for the pipe; and a polymeric jacket is disposed around the pipe and sleeve and the jacket serves as both a heat and electrical insulator.

Another feature of this invention is to provide a conduit construction of the character mentioned wherein the jacket thereof is made of a foamed synthetic plastic having air spaces of substantially uniform size randomly disposed throughout and wherein such air spaces serve to improve the heat insulating properties of the jacket.

Another feature of this invention is to provide a conduit construction of the character mentioned wherein the jacket thereof is made of a foamed synthetic plastic material having a higher density at its periphery and such density improves the impact and wear resistance of the jacket.

Another feature of this invention is to provide an electrically heated fluid-carrying conduit construction comprising a pipe adapted to contain the fluid, an electrical heater for heating the pipe and extending along the length thereof, and a thermal insulating material disposed around the pipe and heater wherein the pipe consists of an electrically insulating polymeric material, and has a seamless sleeve of polymeric material disposed concentrically around the pipe with electrically conductive particles disposed substantially homogeneously therethrough; and the sleeve with its electrically conductive particles comprises the electrical heater for the pipe and has a seamless polymeric jacket disposed around the sleeve and pipe, with the jacket defining the thermal insulating material and also serving as an electrical insulator for the sleeve.

Another feature of this invention is to provide an improved method of making a conduit construction of the character mentioned.

Therefore, it is an object of this invention to provide an improved conduit construction and method of making same having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWINGS

The accompanying drawing shows present preferred embodiments of this invention, in which FIG. 1 is a perspective view with parts in elevation, parts in cross section, and parts broken away illustrating one exemplary embodiment of the conduit construction of this invention;

FIG. 2 is a perspective view with parts in elevation, parts in cross section, parts broken away, and parts shown schematically illustrating method steps employed in making the conduit construction of FIG. 1;

FIG. 3 is a fragmentary perspective view particularly illustrating a further step which may be employed in making a modification of the conduit construction of this invention;

FIG. 4 is a cross-sectional view taken essentially on the line 4—4 of FIG. 2;

FIG. 5 is an enlarged cross-sectional view taken on the line 5—5 of FIG. 2;

FIG. 6 is an enlarged view taken on the line 6—6 of FIG. 3; and

FIG. 7 is a cross-sectional view similar to FIGS. 5 and 6 of a modification of the conduit construction of this invention.

DESCRIPTION OF ILLUSTRATED EMBODIMENT

Reference is now made to FIG. 1 of the drawing which illustrates one exemplary embodiment of an electrically heated fluid-carrying conduit construction of this invention which is designated generally by the reference numeral 10; and, such construction is used in applications for conveying a fluid, such as water, for example, which is subjected to freezing temperatures of zero degrees Centigrade and lower.

The conduit construction 10 comprises a pipe 12 which is adapted to contain liquid therein and has an electrical heater designated generally by the reference numeral 13 for heating such pipe and extending along the length thereof. The pipe 12 is made of an electrically insulating polymeric material and has a seamless sleeve 14, also made primarily of a polymeric material, disposed concentrically around and against the pipe 12 and the seamless sleeve 14 has electrically conductive particles, a representative few of which are designated generally by the same reference numeral 15, disposed substantially homogeneously therethrough with the polymeric material of the sleeve serving as a matrix for the embedded particles 15. The sleeve 14 with its electrically conductive particles comprises a part of the previously mentioned electrical heater 13; and, the electrical conductive particles 15 may be any suitable type known in the art. Preferably such particles are carbonaceous particles.

The conduit construction also comprises a thermal insulating material 16 in the form of a seamless polymeric jacket 16 which is disposed around sleeve 14 and pipe 12; and, the jacket 16 serves the dual purpose of providing thermal insulating material for the pipe 13 and sleeve 14 as well as electrical insulating material for the sleeve 14 with embedded carbonaceous particles.

The jacket 16 is disposed concentrically around the seamless sleeve 14 and pipe 12; and, as shown in FIG. 5 the jacket 14 comprises a plurality of randomly disposed air pockets or pores 17 defined throughout the jacket 14. The pores 17 are of roughly uniform size and add to the heat insulating properties of the polymeric material defining the jacket 14.

Although pipe 12, sleeve 14, and jacket 16 may be of any suitable diameter or size known in the art, it is preferred that the sleeve 14 has a wall thickness which is smaller than the wall thickness 20 of the pipe 12 while the jacket 16 has a wall thickness which is greater than the wall thickness 20 of such pipe 12.

Having described the various tubular conduit portions of the conduit construction 10, reference is again made to FIG. 1 for a more detailed presentation of the electrical heater 13 comprising the conduit construction 10. In particular, the electrical heater comprises an electrical cable assembly 22 which may have a simple male plug P for connection to a source of electrical power such as 120 volt 60 cycle alternating current power commonly available for household use in the United States; and, the electrical assembly 22 also has a pair of leads 23 and 24 connected at one end to the plug P.

The heater 13 also comprises a pair of electrically conductive bands 25 and 26; and, the bands 25 and 26 may be fixed in position utilizing any suitable technique known in the art such as mechanical fasteners, or the like. The bands 25 and 26 are fixed against the sleeve 14 in spaced relation along a predetermined length thereof which defines the length of the heater 13 along the pipe 12.

The heater 13 also comprises an electrically insulated conductor 30 which extends along the construction 10 and is connected by a connection 31 at its near end to the lead 24. The conductor 30 is connected at its remote end to the remote band 26 by another connection 32. It will also be seen that the lead 23 of cable assembly 22 is connected to the band 25 by a connection 33 whereby the portion of the sleeve 14 disposed between the bands 25 and 26 serves as a resistance heating element of heater 13 upon connecting the electrical plug P to its power source.

Other exemplary embodiments of the conduit construction of this invention are illustrated in FIGS. 6 and 7 of the drawing. The conduit constructions of FIGS. 6 and 7 are similar to conduit construction 10; therefore, such conduit constructions will be designated by the reference numerals 10A and 10B respectively and representative parts of each conduit construction which are similar to corresponding parts of the conduit construction 10 will be designated in the drawing by the same reference numeral as in conduit construction 10 (whether or not such parts are mentioned in the specification) followed by the associated letter designation, either A or B, and not described again in detail. Only those component parts of each conduit construction which are substantially different from corresponding parts of the conduit construction 10 will be designated by a new reference numeral also followed by their associated letter designation and described in detail.

The conduit construction 10A of FIG. 6 comprises an inner tube 12A, sleeve 14A, and jacket 16A; however, the jacket 16A is modified as will now be explained. In particular, the jacket 16A comprises randomly disposed air pockets or pores 17A of substantially uniform size which are disposed adjacent the pipe 12A. In addition, the jacket 16A has similar randomly disposed air pockets or pores immediately adjacent the outer periphery of the jacket which are smaller in size, i.e., each has less volume than a pore 17A, than the pores 17A adjacent the pipe 12A whereby the pores adjacent the outer periphery are designated by the reference numeral 34A with a few representative pores being so designated. The smaller size pores 34A result in the jacket 16A having a higher density adjoining the outside surface 35A thereof whereby jacket 16A has greater wear and impact resistance than jacket 16 of construction 10.

The conduit construction 10B of FIG. 7 is similar to the conduit construction 10; however, the main difference therebetween is that the conduit construction 10B is minus the innermost polymeric pipe. Thus, construction 10B has a dual-purpose tubular component which is designated by the reference numeral 14B which serves as the fluid-conveying component and also has electrically conductive particles 15B embedded therein enabling component 14B itself to serve as an electrical heater. It will also be appreciated that the jacket 16B is disposed concentrically around the pipe-sleeve or component 14B in a similar manner as previously described for the jacket 16 of the construction 10.

Having described the conduit constructions 10, 10A, and 10B reference is now made to FIG. 2 of the drawing for a detailed presentation of method steps which may be employed in making the conduit construction 10. Accordingly, the polymeric pipe 12 is provided for further processing and such pipe is preferably a seamless pipe made by extrusion process. The pipe 12 is provided with an integral electrical heating element whereby the pipe 12 is passed through an extrusion apparatus 36 where the seamless sleeve 14 is defined therearound to define such heating element as will now be explained.

In particular, a suitable polymeric material containing electrically conductive particles, such as carbonaceous particles, is provided from a conventional extrusion machine to the apparatus 36 through a conduit 37 whereby the seamless sleeve 14 is disposed concentrically around and against the outside surface of the tube 12 as it is moved through the apparatus 36. The sleeve-coated pipe exists the apparatus 34 as shown at 38 and is then cooled employing a suitable cooling apparatus 39. The cooled sleeve-coated pipe exits the cooling apparatus 39 as shown at 40; and, the conduit construction as shown at 40 is then moved through another extrusion apparatus 41 where the seamless polymeric jacket 16 is extruded concentrically around the sleeve 14 and pipe 12 and the material defining the jacket 16 is provided in the form of a foamed polymeric material from a suitable commercially available forming machine or foamer through a conduit 42 to the apparatus 41. The substantially uniform size pores 17 in the jacket 16 are defined as is known in the art in the above-mentioned commercial foamer.

As previously mentioned, the conduit construction 10 also has an electrically insulated conductor 30 extending therealong and the conductor 30 is illustrated in FIG. 4 and comprises a central conducting wire 43 which has an electrical insulating sleeve 44 disposed concentrically therearound. The conductor 30 is preferably embedded substantially centrally between opposed inside 45 and outside 46 cylindrical surfaces thereof with such conductor preferably extending substantially parallel the longitudinal axis of the jacket 16 which is also the axis of the conduit construction 10 in FIG. 1 and designated by the reference numeral 47. The conductor is preferably disposed in position simultaneously with the extrusion or formation of the jacket 16 and this is achieved by supporting a supply spool 48 thereof for unwinding rotation immediately adjacent the extrusion apparatus 41 and the conductor 30 is unwound from its spool 48 as shown at 50 and fed through the apparatus 41 simultaneously with the extrusion of the polymeric material comprising the jacket 16. The jacket 16 is then suitably cured in a commercially available curing apparatus which is shown schematically by a plurality of arrows 51 to define a construction as shown at 52 which is then suitably cooled and made ready for further processing to define the conduit construction 10 with its integral heater 13.

The integral heater 13 is provided in the conduit construction after determining the desired overall length of such conduit construction. To define the basic heating element of heater 13, jacket 16 and sleeve 14 are stripped from their base tube or pipe 12 to expose a length 53 of pipe 12 at each end of such pipe and each of such ends will be referred to as exposed end 54. The exposed ends 54 are used to connect the pipe to other pipe lengths or other components of the system in which the conduit construction is employed using pipe connectors which are capable of being used with polymeric pipe.

After exposing ends 54 of the pipe 12 the annular bands 25 and 26 are suitably fixed in position against the outside surface of the seamless sleeve 14. It will be appreciated that to facilitate installation of each band 25 and 26 in position an annular portion 55 of the jacket 16 having an axial length 56 is also cut away. Once the annular bands 25 and 26 are installed in position the electrical connections 31, 32, and 33 are provided to connect the bands to the electrical cable assembly 22 and once these connections have been made the annular portions 55 of the jacket 16 are reinstalled and fixed in position employing any suitable fixing means such as an electrically insulating adhesive 60. Once the portions 55 are installed in position at opposite ends of the conduit construction 10 another annular portion (not shown) of the jacket 16 may be suitably fixed against the pipe 12 to completely isolate and electrically insulate an associated band, 25 or 26, and its adjoining end of the seamless sleeve 14. It will also be appreciated that other suitable means, including electrically insulating tape, may be used to isolate the live components of heater 13 in a safe manner.

The ends 54 of pipe 12 are exposed by cutting away parts of the jacket 16 and sleeve 14 and this may be achieved employing suitable commercially available tools. In addition, it is a simple matter to determine the extent of the jacket 16 radially inwardly due to its porous character while a similar extent of sleeve 14 is easily ascertained due to its contrasting color with the polymeric material defining the pipe 12 inasmuch as the sleeve 14 with its carbonaceous particles is usually much darker in color.

The conduit construction 10A of FIG. 6 is made employing method steps which are substantially identical to the steps used to make the conduit construction 10 with a further step which is basically shown in FIG. 3. As described earlier, the outer portion of the jacket 16 has smaller volume pores 34A therein. These pores 34A are provided by compacting the outer portion of the uncured jacket 16A employing cooperating die halves each designated by the same reference numeral 62. In essence, the die halves compress and reduce the outside diameter of the jacket by compressing the air pockets and pores therein to define the construction as shown in FIG. 6 with pore distribution essentially as shown. After compressing of the outer portion of jacket 16A employing the die halves 62, the construction is then moved to the curing apparatus 51 in a similar manner as is described in connection with the conduit construction 10.

The conduit construction 10B of FIG. 7 is preferably made by extrusion of sleeve 14B through apparatus similar to apparatus 36 of FIG. 1 and without a pipe therewithin. After cooling in cooling apparatus 39, the jacket 16B is extruded therearound with conductor 30B in position and the construction further processed in a similar manner as previously described for the conduit construction 10.

In this disclosure of the invention, each insulated conductor 30, 30A and 30B is shown embedded in an associated jacket (either 16, 16A, or 16B); however, it will be appreciated that such conductor may be electrically connected essentially as previously described while running externally of its associated jacket.

The pipes 12 and 12A may be made of any suitable polymeric material, such as synthetic plastic, employed in the art for the purpose of conveying a fluid such as water, or the like; and, which is capable of operating at temperatures substantially below the freezing temperature of water as well as at elevated temperatures approaching and above 100 degrees Centigrade.

It will also be appreciated that each seamless sleeve 14, 14A, and 14B may be made of any suitable polymeric material preferably in the form of a synthetic plastic material which in each instance serves as a matrix for electrically conductive material preferably in the form of electrically conductive carbonaceous particles.

Each jacket 16, 16A, and 16B is also preferably made of any suitable polymeric material such as synthetic plastic material, rubber, and like materials capable of being foamed and cured to define a solid electrically and thermally insulating component with integral air spaces or pores of controlled size or sizes.

While present exemplary embodiments of this invention, and methods of practicing the same, have been illustrated and described, it will be recognized that this invention may be otherwise variously embodied and practiced within the scope of the following claims.

What is claimed is:

1. An electrically heated fluid-carrying conduit construction comprising a pipe adapted to contain said fluid, an electrical heater for heating said pipe disposed around said pipe and extending along the length thereof, and a thermal insulating material disposed around said heater, wherein said pipe consists of an electrically insulating synthetic plastic material, wherein said heater comprises a seamless sleeve of synthetic polymeric material having electrically conductive particles disposed substantially homogeneously therethrough, an electrical cable assembly having an electrical connector for connection to a power source and a pair of leads extending therefrom, a pair of electrically conductive bands fixed against said sleeve in spaced relation along a predetermined length thereof defining the length of said heater along said pipe, means for connecting one of said pair of leads to one of said pair of bands and means for connecting the other of said pair of leads to the other of said pair of bands; and wherein said insulating material consists of a seamless jacket of foamed synthetic plastic material having randomly disposed air pockets therethrough, wherein the outer portion of said jacket is in a more compacted condition than the inner portion of said jacket so that the air pockets immediately adjacent the outer periphery of said jacket are of a size smaller than the air pockets immediately adjacent said heater, whereby said jacket has a higher density on the outside surface thereof for greater wear and impact resistance and good thermal insulating properties adjacent said pipe.

2. The conduit construction of claim 1 wherein said electrically conductive particles are carbonaceous particles.

* * * * *